United States Patent
Lebang

(10) Patent No.: US 11,578,792 B2
(45) Date of Patent: Feb. 14, 2023

(54) OFFSET CHAMFERED TEETH FOR COAXIAL COOPERATING GEARS IN VEHICLE POWER TRAINS

(71) Applicant: Zhejiang CFMOTO Power Co., Ltd., Zhejiang (CN)

(72) Inventor: Xie Lebang, Hangzhou (CN)

(73) Assignee: Zhejiang CFMOTO Power Co., Ltd., Zhejiang (CN)

( * ) Notice: Subject to any disclaimer, the term of this patent is extended or adjusted under 35 U.S.C. 154(b) by 356 days.

(21) Appl. No.: 16/775,260

(22) Filed: Jan. 28, 2020

(65) Prior Publication Data

US 2020/0240504 A1    Jul. 30, 2020

(51) Int. Cl.
*F16H 55/08* (2006.01)
*B23F 19/10* (2006.01)
*F16H 1/20* (2006.01)
*F16H 57/02* (2012.01)

(52) U.S. Cl.
CPC ......... *F16H 55/0873* (2013.01); *B23F 19/10* (2013.01); *F16H 1/20* (2013.01); *F16H 57/02004* (2013.01)

(58) Field of Classification Search
CPC .. F16H 55/0873; F16H 1/20; F16H 57/02004; B23F 19/10
See application file for complete search history.

(56) References Cited

U.S. PATENT DOCUMENTS

| | | | |
|---|---|---|---|
| 4,726,258 A | 2/1988 | Hayashi et al. | |
| 4,879,919 A | 11/1989 | Sekizaki | |
| 5,181,893 A | 1/1993 | Ashikawa et al. | |
| 6,370,977 B1 * | 4/2002 | Kubo | F16H 63/30 74/342 |
| 6,554,883 B1 * | 4/2003 | Onderko | B22F 5/08 419/38 |
| 6,730,263 B2 * | 5/2004 | Ernst | B22F 5/08 419/38 |
| 6,848,554 B2 * | 2/2005 | Youk | F16D 23/06 192/53.32 |
| 7,631,570 B2 | 12/2009 | Mizuno et al. | |
| 8,015,895 B2 | 9/2011 | Tomoda et al. | |
| 8,191,443 B2 | 6/2012 | Inui et al. | |

(Continued)

FOREIGN PATENT DOCUMENTS

DE    102018008500 A1 *    5/2019    ............ F16D 23/06

*Primary Examiner* — Zakaria Elahmadi
(74) *Attorney, Agent, or Firm* — Shewchuk IP Services, LLC; Jeffrey D. Shewchuk

(57) ABSTRACT

A power train component such as a gearbox includes driving and driven, coaxially arranged cooperating gears which engage each other via teeth. The engaging end surfaces of the teeth are provided with a first chamfer and a second chamfer, in which the chamfer edge is offset from bisecting the tooth. Preferably the offset chamfer edges are provided on both a driving gear (shifter), axially positionable using a shifting fork on a shift drum, and a driven low gear. In one preferred driving gear (shifter) design, the offset chamfer edges are only provided for the side engaged when the shifting fork moves against a spring force. The invention facilitates smoother and less binding movement between the non-engaged and the engaged axial positions, such that the gear can be more easily shifted by the shifting fork in at least one direction.

20 Claims, 14 Drawing Sheets

(56) References Cited

U.S. PATENT DOCUMENTS

| | | | |
|---|---|---|---|
| 8,276,473 B2 | 10/2012 | Kobayashi et al. | |
| 8,387,477 B2 | 3/2013 | Ieda et al. | |
| 8,397,596 B2 | 3/2013 | Tomoda et al. | |
| 8,707,814 B2 | 4/2014 | Saitoh | |
| 9,027,430 B2 | 5/2015 | Mitsubori et al. | |
| 9,091,341 B2 | 7/2015 | Watanabe et al. | |
| 9,228,638 B2 | 1/2016 | Matsumoto | |
| 9,334,955 B2 | 5/2016 | Norita et al. | |
| 9,945,477 B2 | 4/2018 | Nakamura et al. | |
| 10,030,769 B2 | 7/2018 | Sugano et al. | |
| 10,323,694 B2 | 6/2019 | Bessho et al. | |
| 2003/0024335 A1* | 2/2003 | Matsumoto | F16D 23/06 74/333 |
| 2008/0295627 A1* | 12/2008 | Okadome | F16H 3/093 74/331 |
| 2013/0118283 A1* | 5/2013 | Turnback | F02N 15/06 29/893 |
| 2017/0370422 A1* | 12/2017 | Bessho | B60K 17/34 |
| 2018/0112721 A1* | 4/2018 | Koelzer | F16D 23/025 |
| 2018/0119792 A1* | 5/2018 | Vuksa | F16H 1/12 |
| 2019/0249752 A1* | 8/2019 | Jung | H02K 7/116 |

* cited by examiner

OFFSET CHAMFERED TEETH FOR COAXIAL COOPERATING GEARS IN VEHICLE POWER TRAINS

CROSS-REFERENCE TO RELATED U.S. APPLICATION(S)

None.

FIELD OF THE INVENTION

The invention relates to the technical field of all-terrain vehicles and motorcycles, and particularly to coaxially interacting gears in power trains of such vehicles, such as within a gearbox of the vehicle.

BACKGROUND OF THE INVENTION

Utility vehicles ("UVs"), all terrain vehicles ("ATVs") including side-by-sides, and motorcycles commonly utilize a one or two cylinder internal combustion engine that provides the torque necessary for locomotion over a wide variety of terrains, including over roads, unpaved trails, fields, rocks, etc. In such vehicles, the torque output by the engine commonly changes speed and/or direction between the engine output shaft and the half-shaft driving the ground engaging member(s) through a gearing arrangement, which can occur in a transmission, in a gear box, or in a differential of the power train. Within certain designs of such power train components, the torque transfer may involve a set of two interacting gears which are coaxially mounted on the same shaft and moved axially with respect to each other between an engaged, torque transferring position and a disengaged position where the vehicle torque bypasses at least one of the two engageable gears. Similar power trains may exist in certain snowmobiles, personal watercraft or similar vehicles. A common example is within a gearbox which allows the vehicle to operate in forward (high gear), forward (low gear), neutral and reverse, perhaps using a shifting drum. For example, U.S. Pat. Nos. 4,726,258, 4,879,919, 5,181,893, 7,631,570, 8,015,895, 8,191,443, 8,276,473, 8,387,477, 8,397,596, 8,707,814, 9,027,430, 9,091,341, 9,228,638, 9,334,955 9,945,477 and 10,030,769, each incorporated by reference for such vehicle, power train and power train component teachings, are believed to all disclose structures in which the axial (longitudinal) position of one internally splined driving gear (also referred to as a "shifter" or "shifting sleeve") is controlled, by a shift fork which is in turn positioned by a shift drum (also called a "shift cam"), either to engage (and transfer torque) or not engage with a cooperating coaxially mounted driven gear. The driven gear typically then includes outer gear teeth which rotate and drive the output gear and therethrough drive the drive shaft(s). Most commonly, the driving gear (shifter) includes teeth which, during engagement, mate into recesses of the driven gear. A reversal of parts is also possible, with the shifter providing the outer gear teeth and the driven gear having the internal splined connection to the shaft. Similarly, a reversal of shift motion is also possible, with the driven gear changing its axial position rather than the driving gear.

In many such structures, either the shift fork (most commonly) or the axially-moving gear is axially biased, such as by a spring, toward one axial direction. The spring-biased shifting allows the axial movement of the driving gear (shifter) to occur under a regulated force largely or entirely created by the spring and largely determined by selection of the desired spring constant.

To reduce the size of the gearbox or other power train component, some designs use an axially-moving driving gear which is fork-controlled not merely between two axial positions, but between three axially positions, such as from a) a middle (neutral, or non-engaged position) either to b) the left for engagement with one driven (perhaps high) gear, or to c) the right for engagement with a second (perhaps low) driven gear. In such cases, at least one of the movements of the axially-moving gear will be against the biasing spring force, which in general means that the axial movement force causing engagement of the driving gear (shifter) with one of the driven gears will not be as well controlled. For instance, the force pushing the driving gear (shifter) against and overcoming the spring force may depend on the speed and force used by the operator on the gear selector in the cab of the vehicle. In use, the driving gear (shifter) can bind against engagement in at least one direction and it can be difficult to smoothly shift the gear. Even when axially moving the driving gear (shifter) in the spring-induced direction, binding can still occur. Better solutions are needed.

BRIEF SUMMARY OF THE INVENTION

In view of this background, the present invention provides a better type of tooth on the driving and/or driven, coaxially arranged cooperating gears, which facilitates smoother and less binding movement between the non-engaged and the engaged axial positions, such that the gear can be more easily shifted by the shifting fork in at least one direction. The engaging end surface of the teeth are provided with a first chamfer and a second chamfer, in which the chamfer edge is offset from bisecting the tooth. Preferably the number of teeth in engagement between the driving gear (shifter) and the driven gear is high, and the offset chamfer edges are provided on both the driving gear (shifter) and the driven gear. In one preferred driving gear (shifter) design, the offset chamfer edges are only provided for the side engaged when the shifting fork moves against the spring force.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
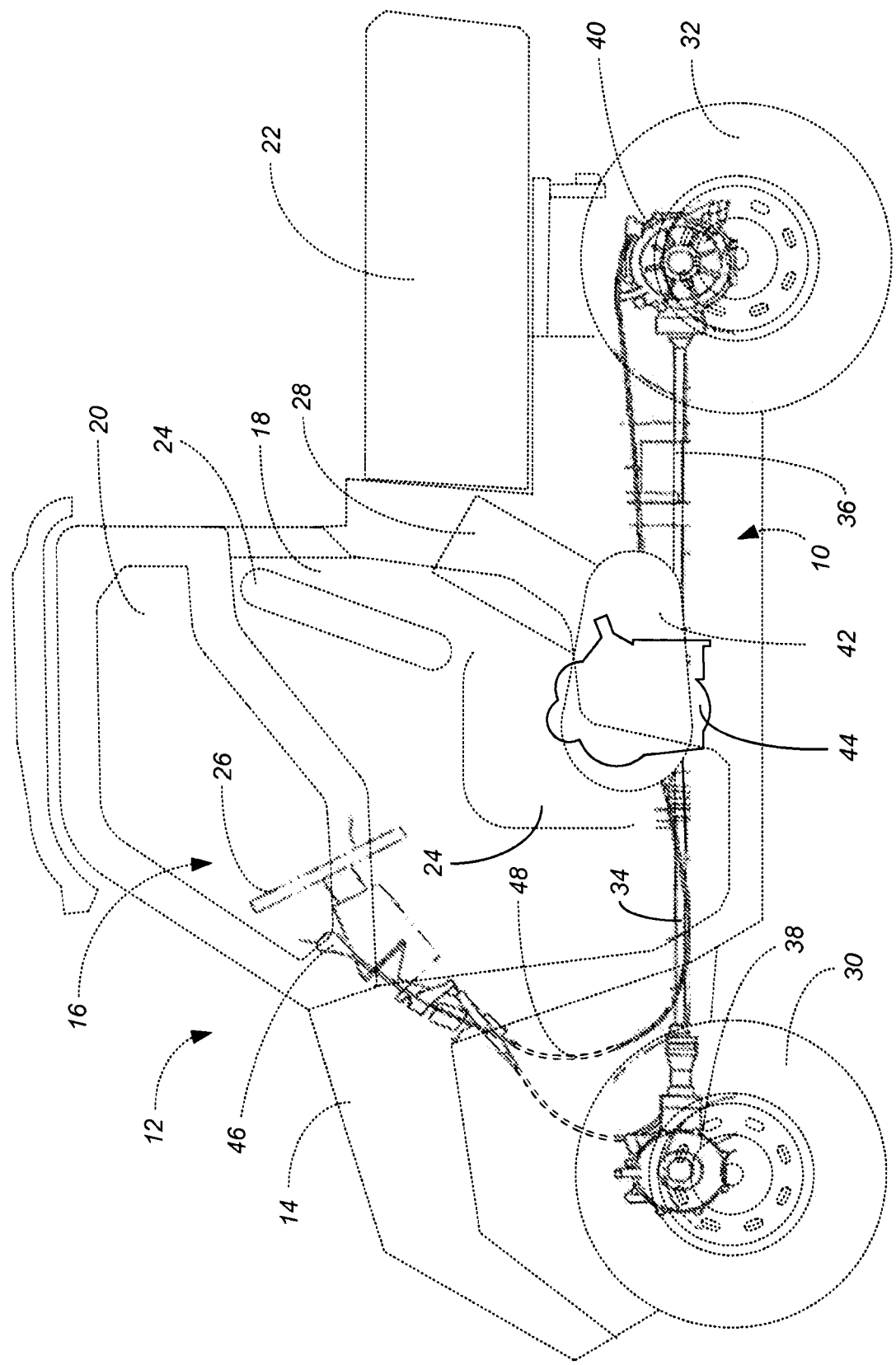
FIG. 1 is a schematic side view of an all-terrain vehicle using the present invention within its drive train.
Figure 2:
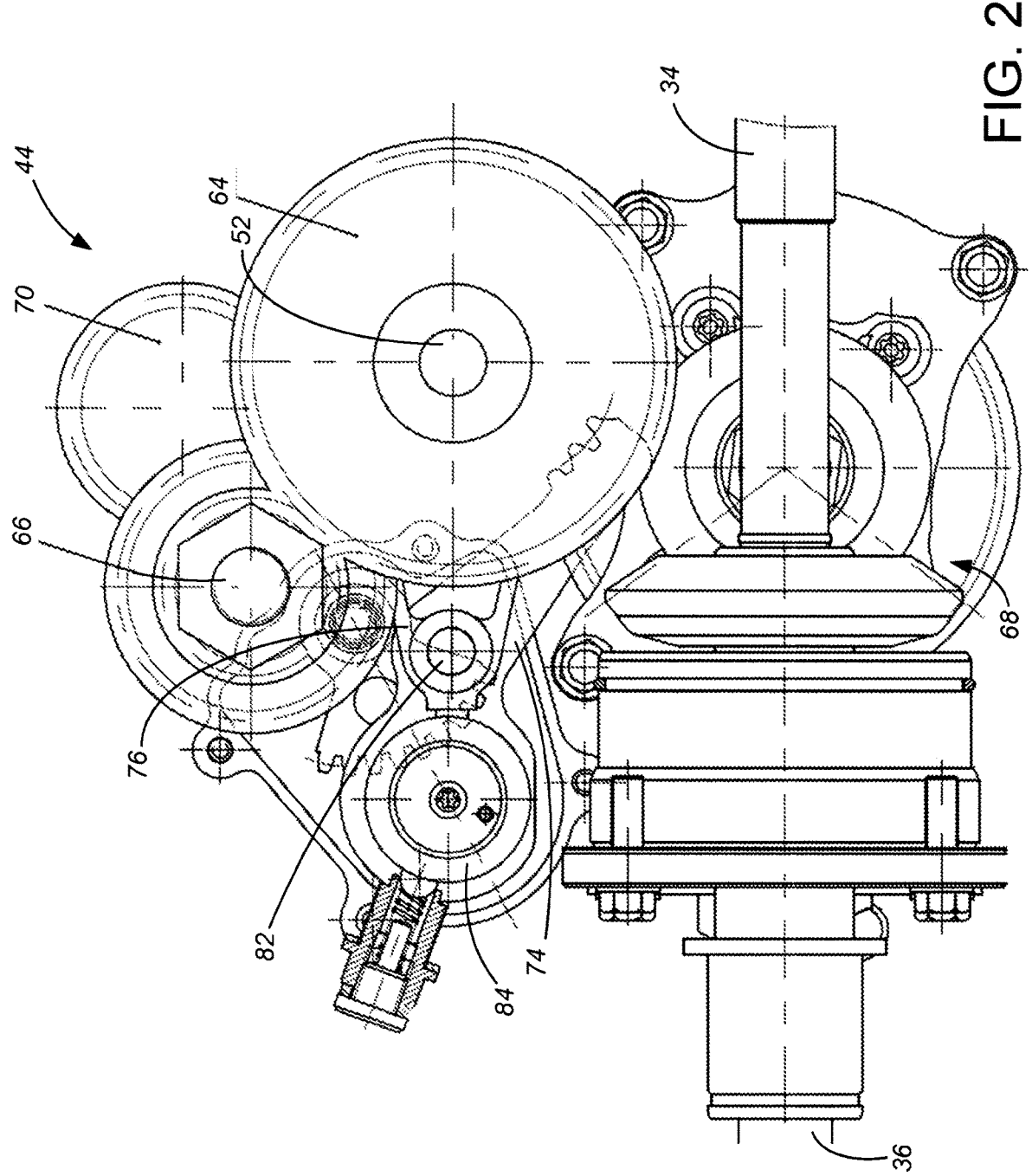
FIG. 2 is an end view of gearing using the present invention on one of the driving gears within a gearbox of the drive train of the vehicle of FIG. 1.
Figure 3:
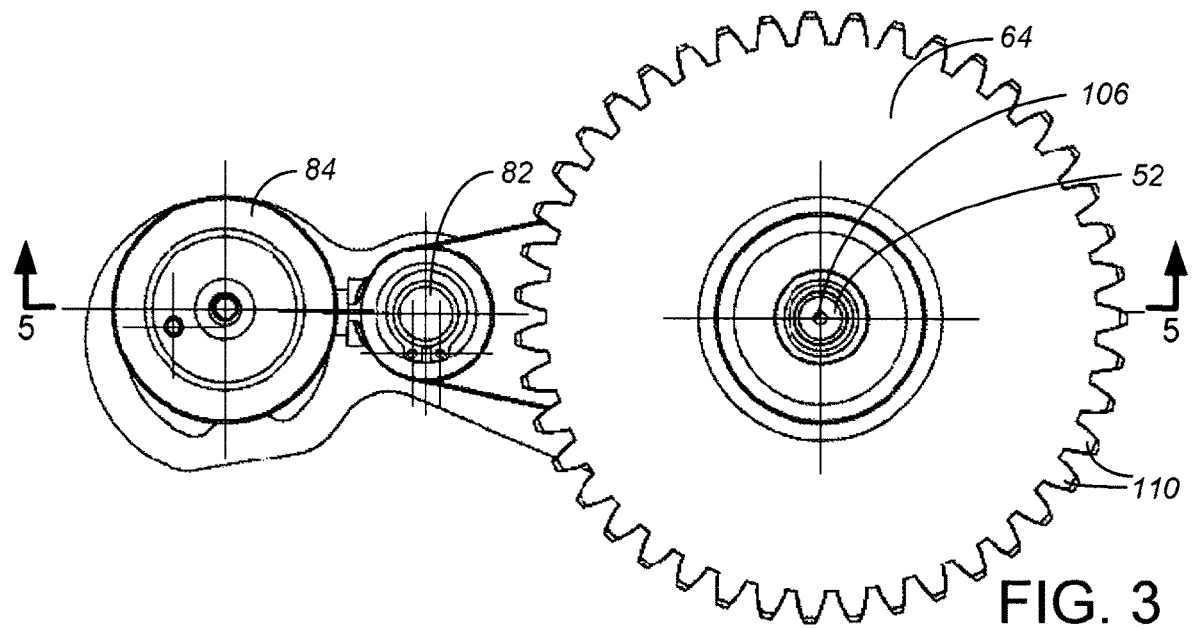
FIG. 3 is an end view, from the driven (low) gear side, of the gear shifting portion of the gearbox of FIGS. 1 and 2.

The present invention involves a better type of tooth on driving and/or driven, coaxially arranged, interacting gears in the power train 10 of a vehicle such as the all-terrain vehicle 12 shown schematically in FIG. 1. The vehicle 12 is depicted with a front hood 14, a passenger compartment 16 with a door 18 and side window 20, and a rear cargo space 22. The driver (not shown) sits on a seat 24 and drives using a steering wheel 26. The vehicle 12 has a mid-mounted engine 28 which drives the front wheels and tires 30, the rear wheels and tires 32, or both the front and rear wheels, 30, 32 using a front drive shaft 34 and a rear drive shaft 36. While the invention could be used elsewhere in the power train 10 such as in a front differential 38, a rear differential 40, or in a manual transmission (not shown), in the preferred embodiment the power train 10 is driven by a one or two cylinder internal combustion engine 28 using a continuously variable transmission ("CVT") 42, and the invention is used in a gear box 44. The specific front-to-rear, up-to-down and left-to-right layout of the engine 28, CVT 42 and gear box 44 is insignificant as the gear box 44 can be reoriented, mirrored or flipped for any drive train layout as desired by the vehicle designer.

The preferred gear box 44 is operational based on a control within the cab of the vehicle 12, such as a gear selector 46 that allows selection by the operator between park ("P"), reverse ("R"), neutral ("N"), high ("H") and low ("L") gears. For instance, the gear selector 46 can be positioned on a dash (as shown) or console of the vehicle 12, connected to the gearbox 44 by a cable 48, lever or other linkage. One embodiment showing a portion of the internal mechanical structure within the gearbox 44 is shown in FIGS. 2-8.

At least one of the gears within the gear box 44 is keyed or otherwise secured for rotation with rotation of its shaft 52, which in this embodiment is powered from the crankshaft output of the engine 28, and will be referred to as the driving gear 50. In the preferred embodiment, the torque transfer from the shaft 52 to the driving gear 50 is achieved by having a splined inside diameter 54, which rides on a splined outer diameter 56 of a section of an input shaft 52, with the input shaft 52 being separately driven such as by a separate gear 58 or other driving mechanism (not shown). In the most preferred embodiment shown, the separate driving gear 58 is axially moving and is used for operating the vehicle 12 in reverse. In the most preferred embodiment, the torque output of the gear shifting portion can be either on a reverse driven gear 60, on a high driven gear 62 or on a low driven gear 64, depending upon the axial location of the driving gear 50 and the separate driving gear 58, delivered to gears on a transmission main shaft 66 (shown only in FIG. 2). The transmission main shaft 66 then provides torque to the input shaft of the CVT 42 (shown only in FIG. 1), which outputs torque through a bevel gear assembly 68 to the drive shafts 34, 36. When operating in reverse, torque is transmitted through a reverse idle gear 70 (shown only in FIG. 2) which changes the direction of rotation of the transmission main shaft 66. In alternative embodiments, the reversal of rotational direction for driving the vehicle 12 in reverse can be achieved such as by a chain connection (not shown) between the input shaft 52 and the transmission main shaft 66.

A park lock gear 72 can also be secured for rotation with the shaft 52. A park lock lever 74 is used, which can interact with the park lock gear 72 to restrict rotation of the shaft 52.

Figure 4:
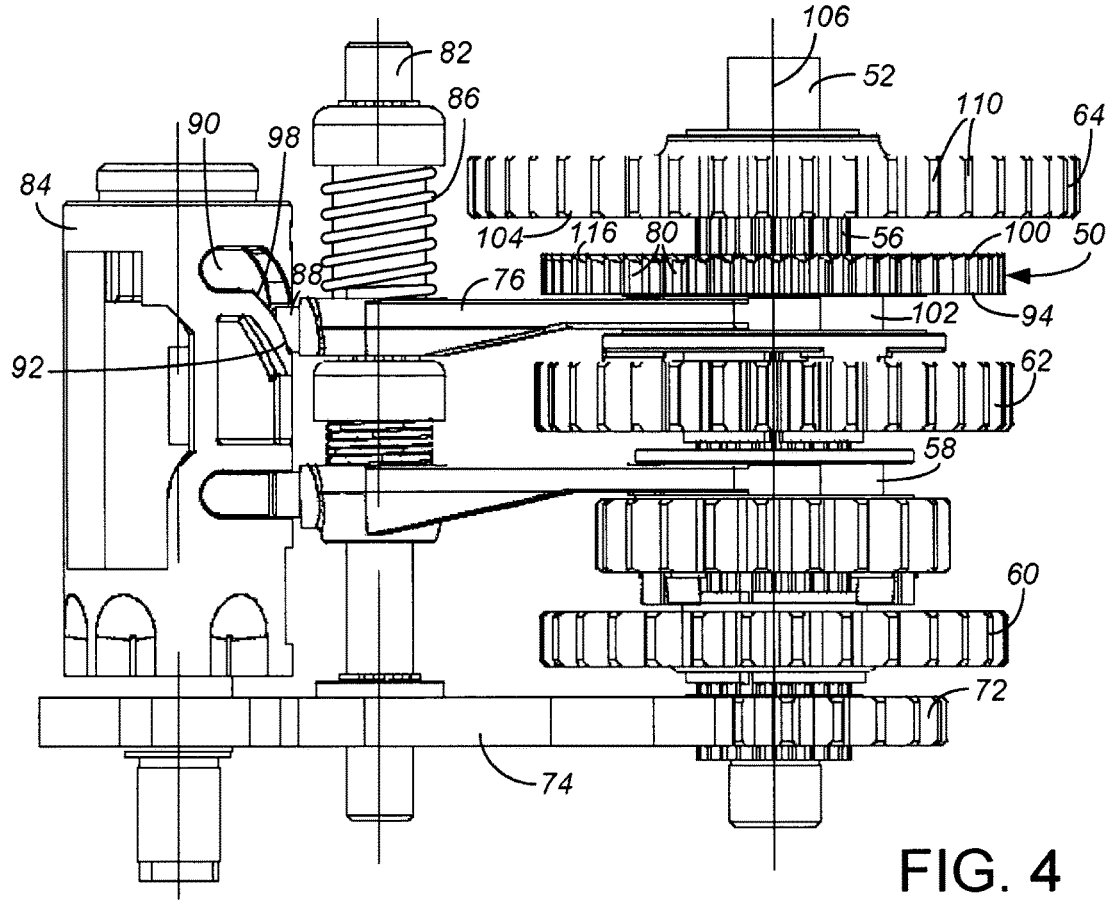
FIG. 4 is a bottom side view of the gear shifting portion of FIG. 3, taken while the gear shifting portion is in high gear.
Figure 5:
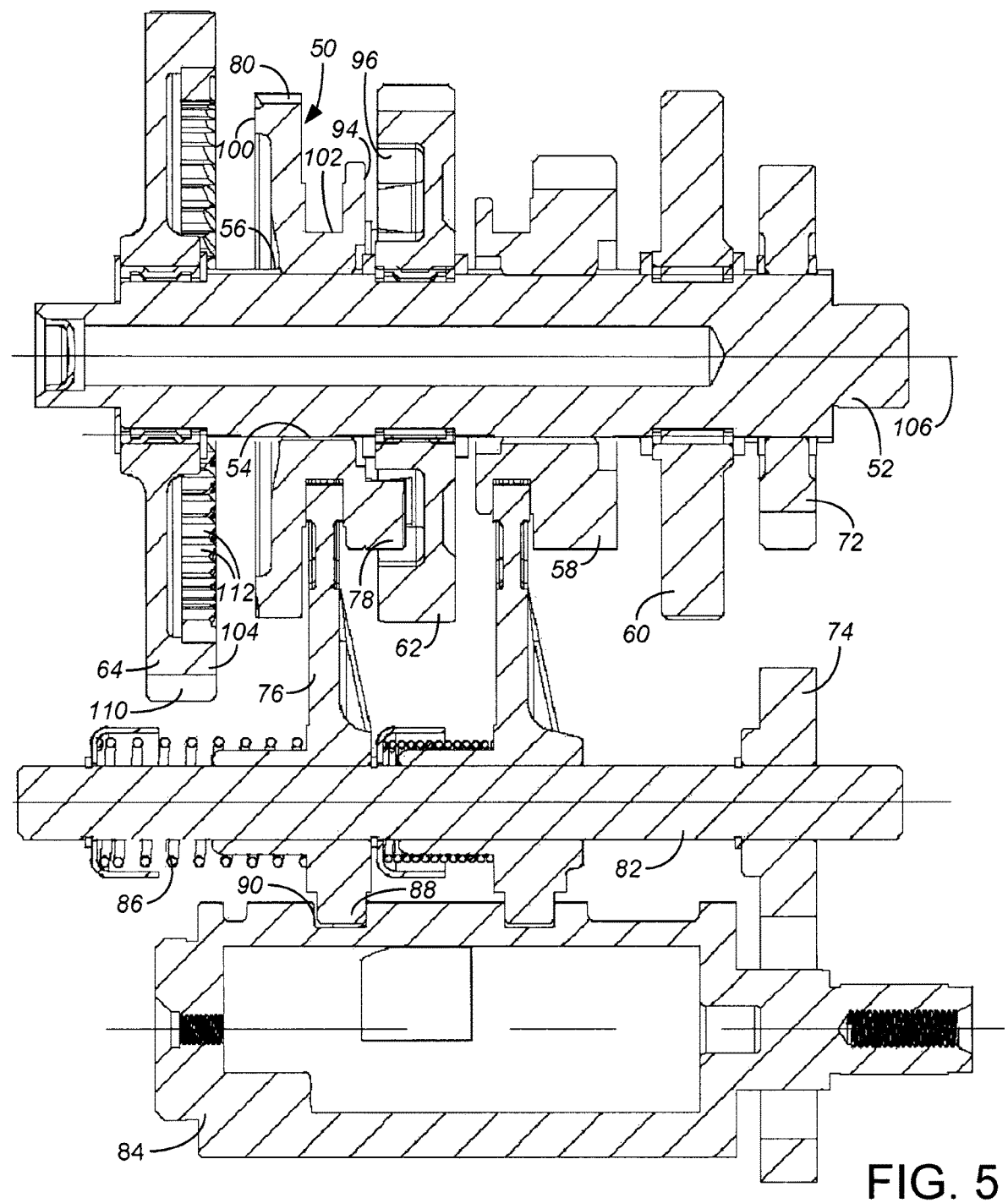
FIG. 5 is a cross-sectional view of the gear shifting portion of FIGS. 3 and 4, taken along line 5-5 in FIG. 3.
Figure 6:
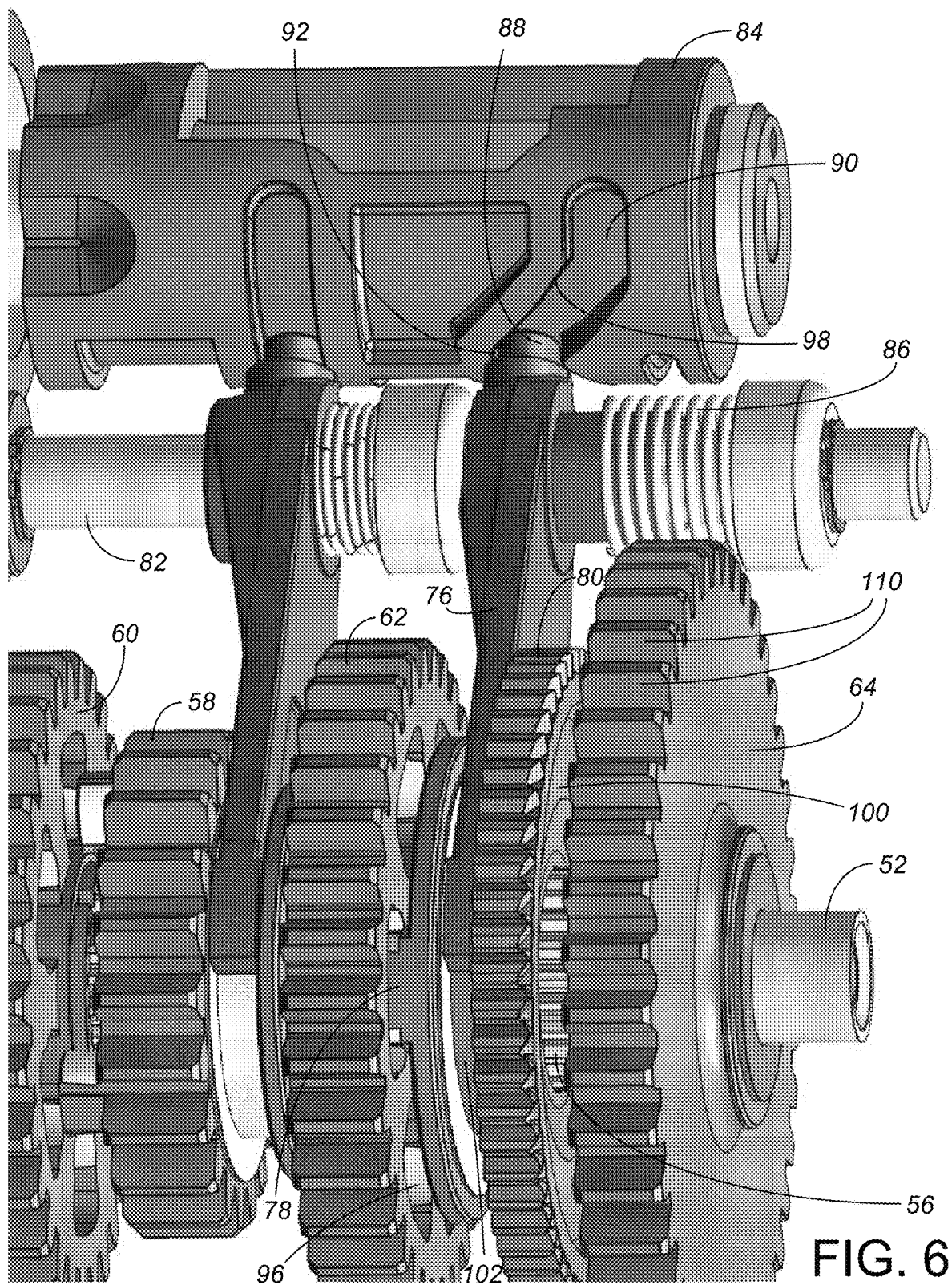
FIG. 6 is a perspective view of the gear shifting portion of FIGS. 3-5.
Figure 7:
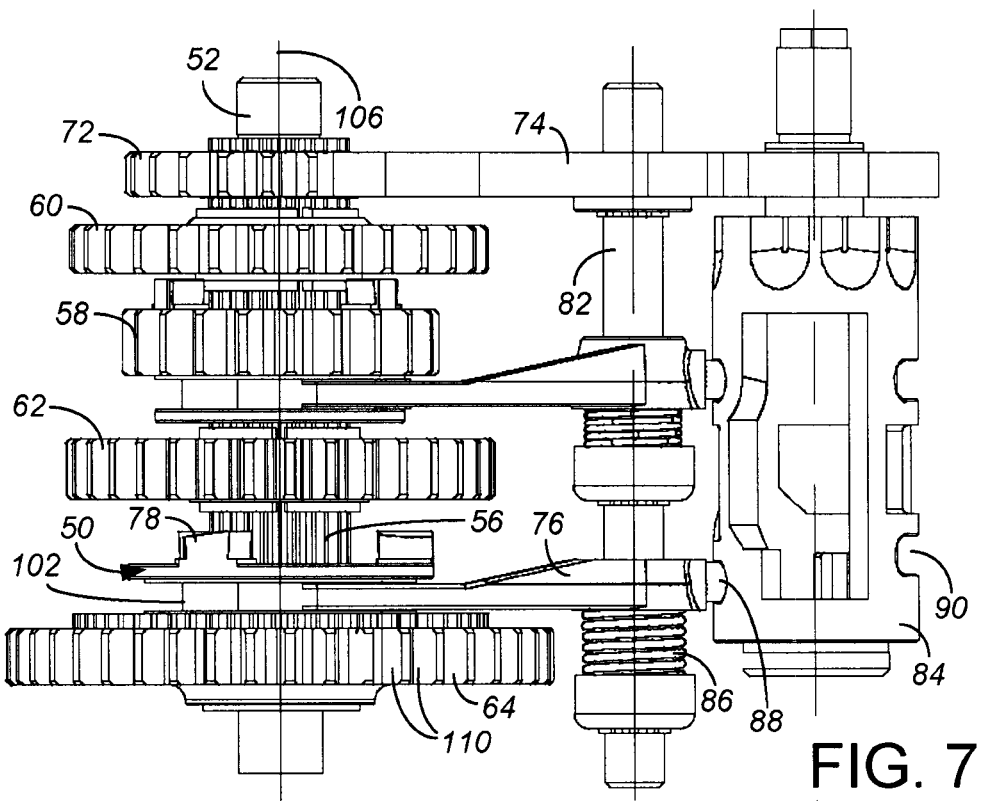
FIG. 7 is a side view similar to FIG. 4 of the gear shifting portion, but taken while the gear shifting portion is in low gear.
Figure 8:
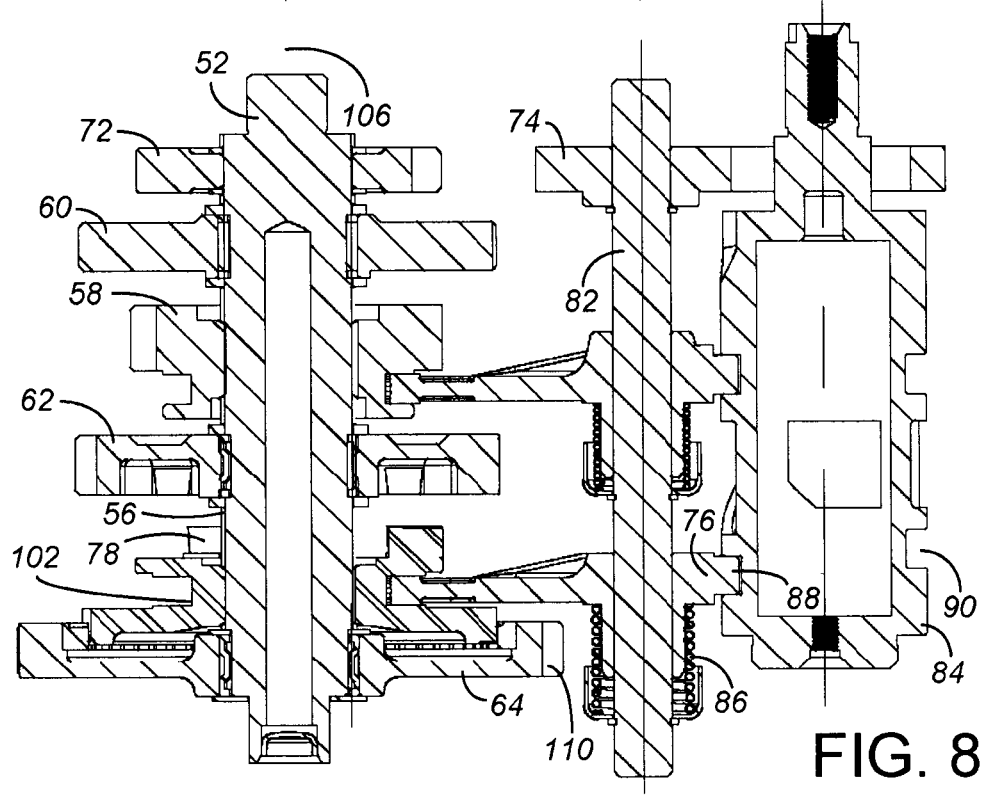
FIG. 8 is a cross-sectional view similar to FIG. 5 of the gear shifting portion, but taken while the gear shifting portion is in high gear.

In the most preferred embodiment shown, the invention is being employed only with the driving/driven gear set 50/64 used for operating the vehicle 12 in low gear. FIGS. 4-6 show the driving gear 50 in engagement with a high driven gear 62. The axial position of the driving gear 50 is controlled by movement of a fork 76. The fork 76 can push the driving gear 50 from a middle neutral or park condition in either direction. When the fork 76 pushes the driving gear 50 to the left to the position shown in FIGS. 4-6, teeth 78 (or potentially dogs, not shown) of the driving gear 50 engage with the high driven gear 62. The fork 76 can alternatively push the driving gear 50 in the opposite direction, i.e., to the right, such that other teeth 80 of the driving gear 50 engage with the low driven gear 64 as shown in FIGS. 7 and 8.

In the preferred arrangement, the fork 76 rides on a fork support shaft 82, with the axial position on the fork shaft 82 controlled by the circumferential position of a shifting drum 84. In this embodiment, the fork 76 of interest is biased to the left by a compression spring 86. The circumferential position of the shifting drum 84 is cable-controlled and/or linkage-controlled by the operator using the gear selector 46. A control arm 88 of the fork 76 rides within a recess 90 of the shift drum 84, pressed against the left side of the recess 90 by the spring 86. FIGS. 4-6 show a portion of the gearbox 44 while the operator has selected high gear. The circumferential position of the shift drum 84 is such that the control arm 88 is at a leftward section of the recess 90, i.e. when the operator used the gear selector 46 to rotate the shift drum 84 such that the control arm 88 was at the leftward section 92, the spring 86 pushed the fork 76 moving it to the left. The fork 76 has in turn pushed the driving pear 50 to the left, moving the driving pear 50 into engagement with the high driven gear 62. In this particular embodiment, the driving gear 50 includes three axially projecting teeth 78 on the face 94 toward the high driven gear 62. The high driven gear 62 freely rotates on a smooth section of the shaft 52. The high driven gear 62 includes six recesses or openings 96 (shown only in FIG. 6), which can mate with and receive the three teeth 78. With the three teeth/six recess configuration, when the operator is shifting from neutral to high gear, the driving gear 50 will rotate (usually due to the torque from the shaft 52) at most 60° circumferentially relative to the high driven gear 62, until the teeth 78 align with the recesses 96 and the spring force pushes the driving gear 50 into engagement with the high driven gear 62.

If the operator further shifts from high into low, a ramp 98 of the recess 90 will cause the fork 76 to move back to the right against the force of the spring 86, compressing the spring 86. The ramp 98 moves the fork 76 past the neutral position, pushing the fork 76 and the driving gear 50 further to the right, until teeth 80 on the right side 100 of the driving gear 50 come into engagement with the low driven gear 64. The shape of the recess 90 is further described in co-pending application Ser. No. 16/775,266, filed on even date herewith and incorporated by reference.

The present invention is directed at the shape of the interacting gear teeth surfaces between a pair of cooperating co-axial gears, where one of the cooperating gears moves axially relative to the other between engaging and non-engaging positions. In this preferred embodiment, the present invention is directed at the shape of the gear teeth surfaces which interact during axial movement between the driving gear 50 and the low driven gear 64. In contrast to other gear shift changes, which may be constrained to only be allowed either while the vehicle 12 is stationary and/or while the operator is braking, shifting from high to low gear is commonly allowed while the vehicle 12 is travelling (at least at low speed), and possibly while the operator is providing torque/accelerating the vehicle 12 (such as while depressing the gas pedal or turning the throttle).

Figure 9:
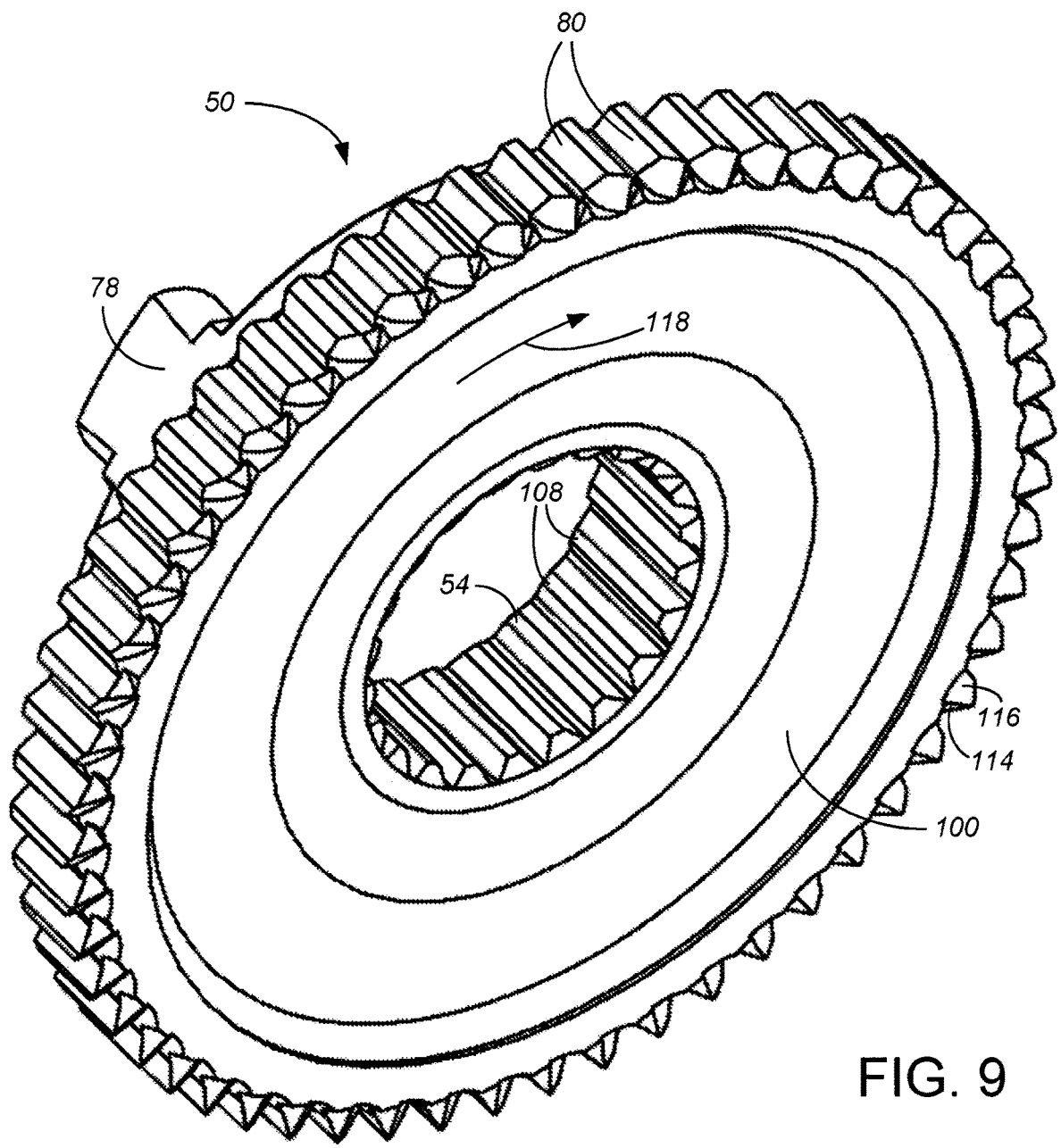
FIG. 9 is a perspective view of the axially moving driving gear within the gear shifting portion of FIGS. 3-8, the gearbox of FIG. 2 and the vehicle of FIG. 1, taken from the side facing the low driven gear, utilizing the present invention.
Figure 10:
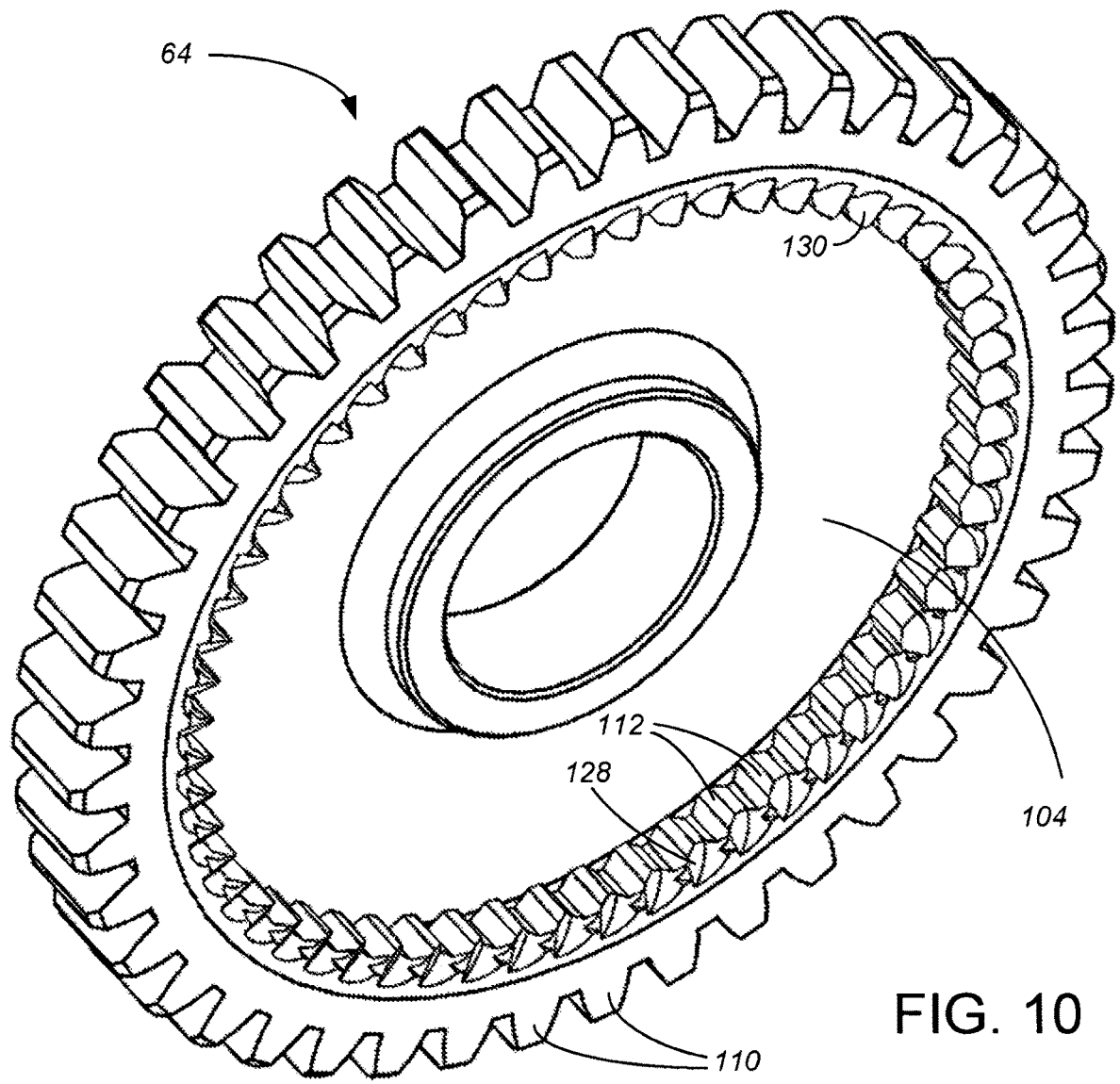
FIG. 10 is a perspective view of the low driven gear within the gear shifting portion of FIGS. 3-8, the gearbox of FIG. 2 and the vehicle of FIG. 1, taken from the side facing the axially moving driving gear, utilizing the present invention.
Figure 11:
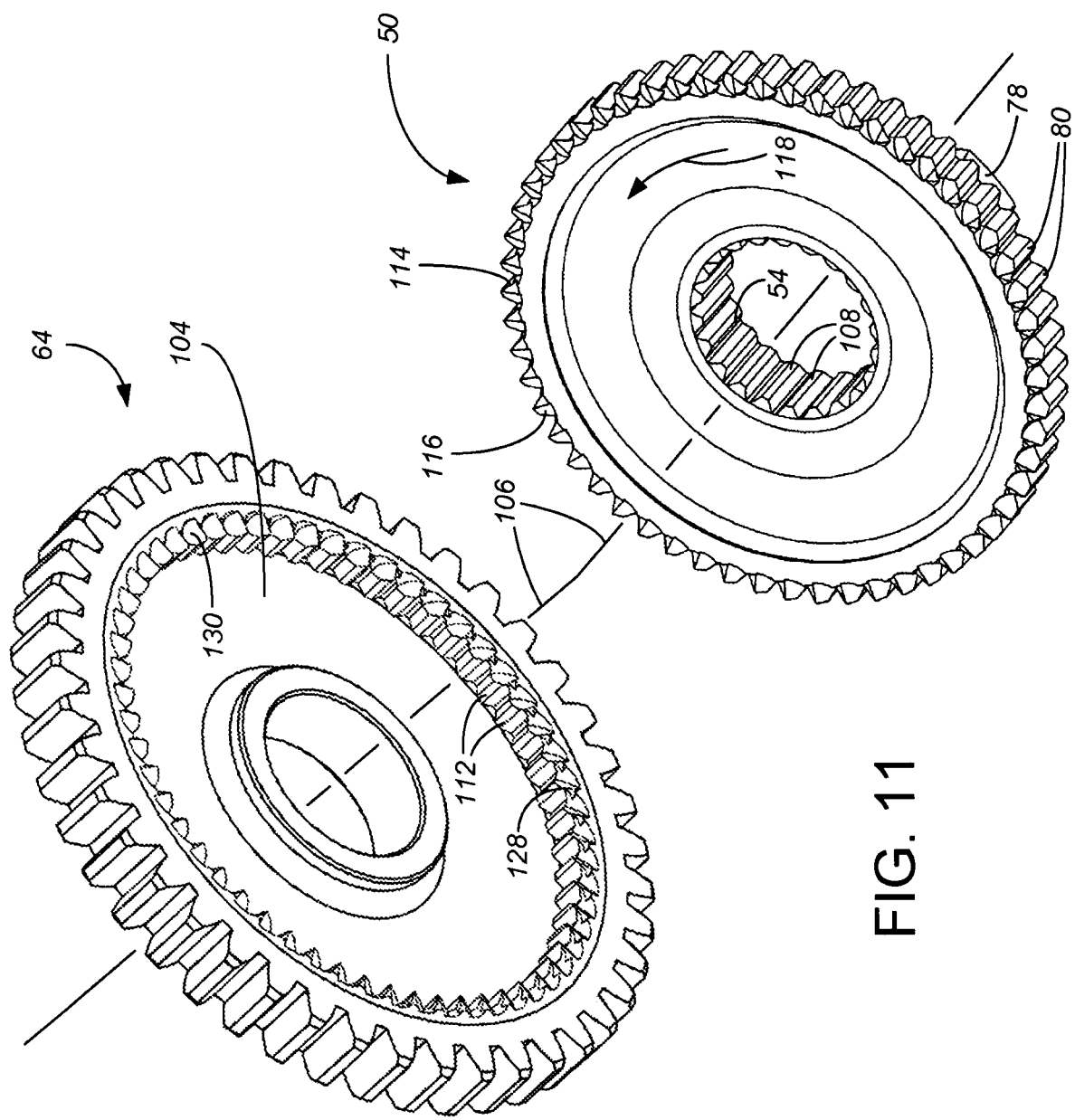
FIG. 11 is a perspective view, showing both faces that fit together, of the axially moving driving gear and low driven gear of FIGS. 1-10.
Figure 12:
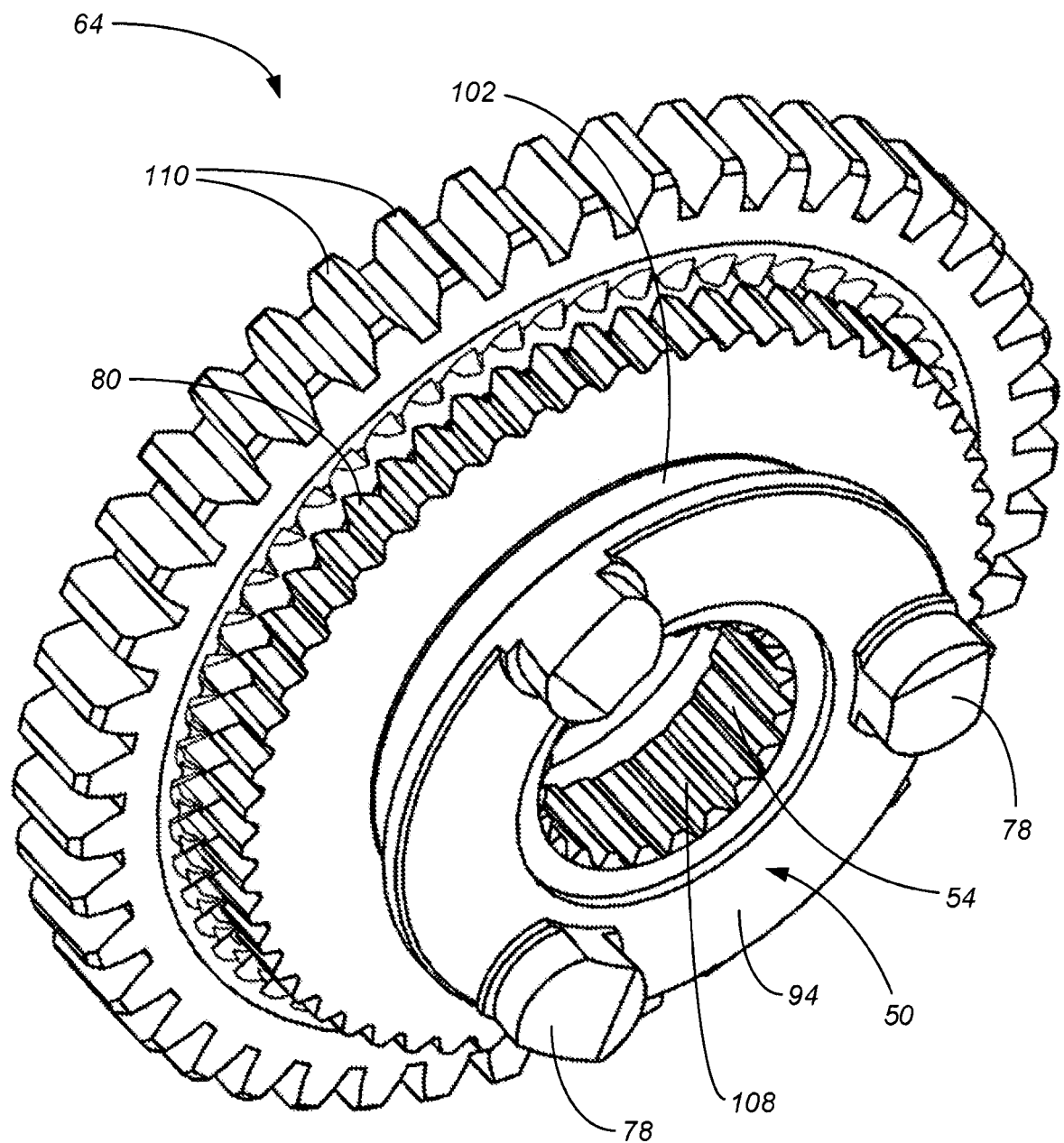
FIG. 12 is a perspective view of the axially moving driving gear and low driven gear of FIGS. 1-11, in their relative positions when disengaged (park, neutral or reverse).
Figure 13:
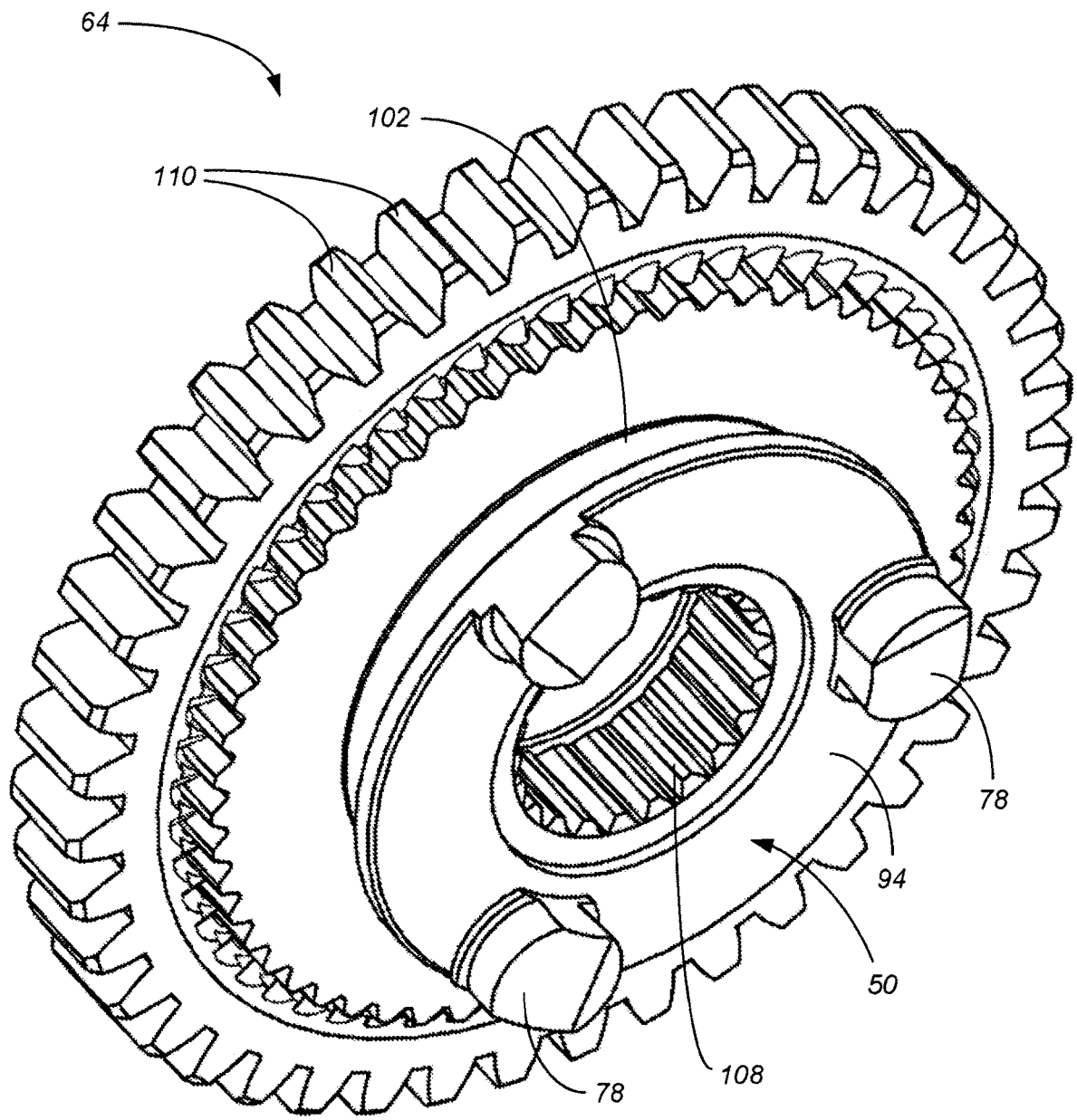
FIG. 13 is a perspective view of the axially moving driving gear and low driven gear similar to FIG. 12, but in their relative positions when engaged (low).
Figure 14:
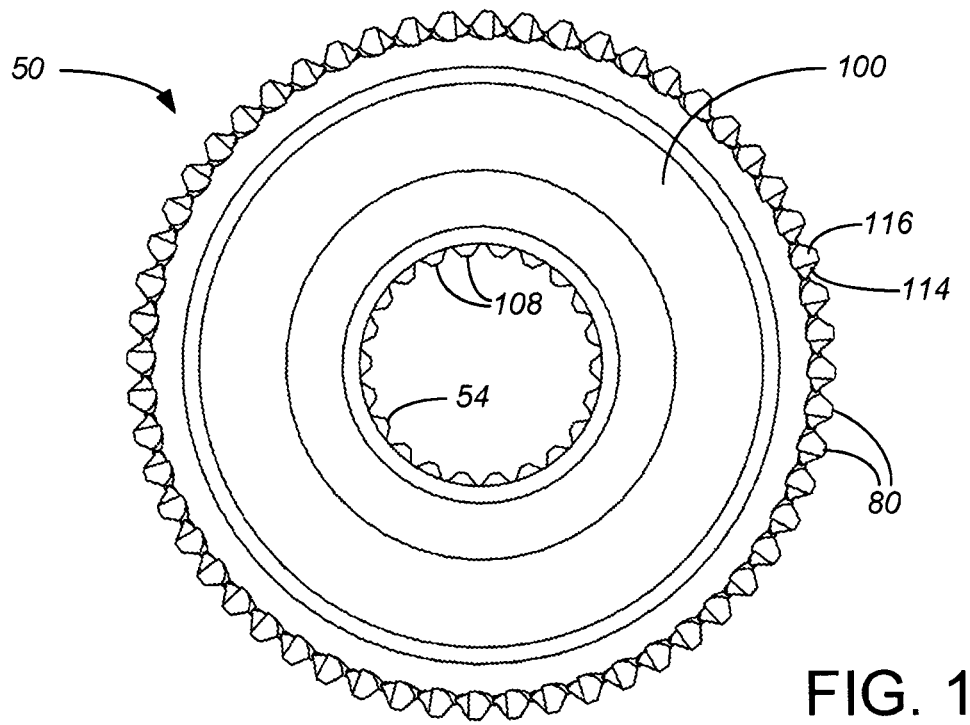
FIG. 14 is a side view of the axially moving driving gear, taken from the side facing the low driven gear, utilizing the present invention.
Figure 15:
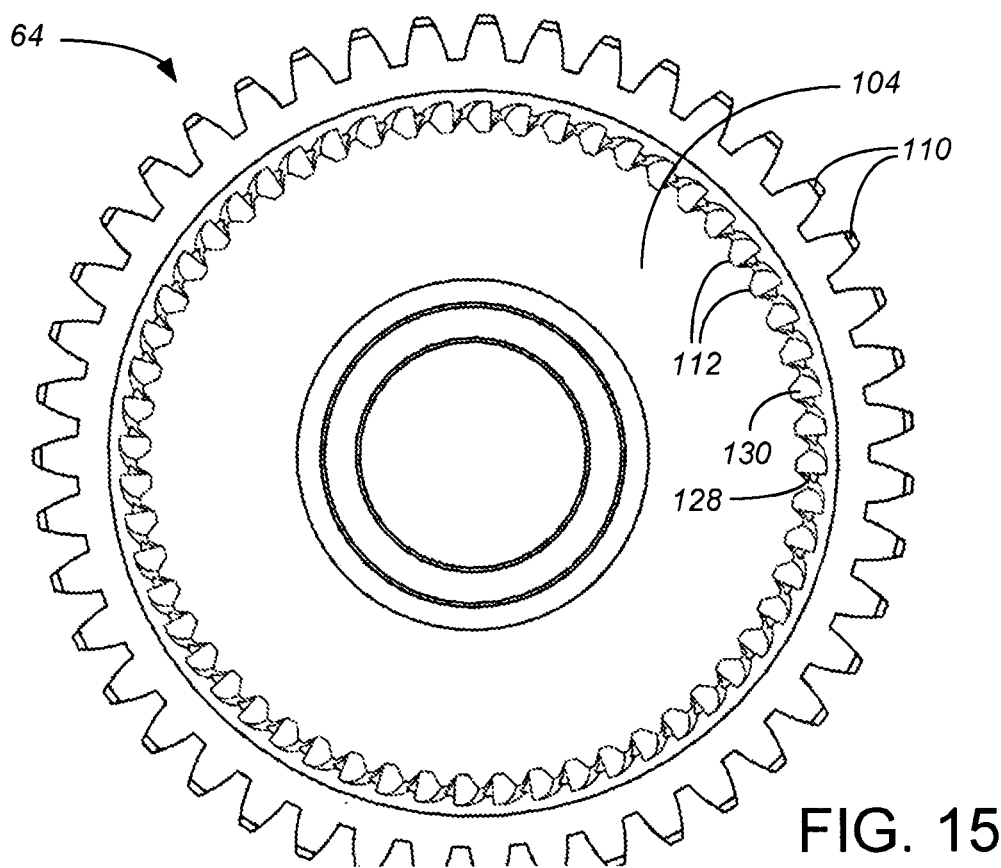
FIG. 15 is a side view of the low driven gear, taken from the side facing the axially moving driving gear, utilizing the present invention.
Figure 16:
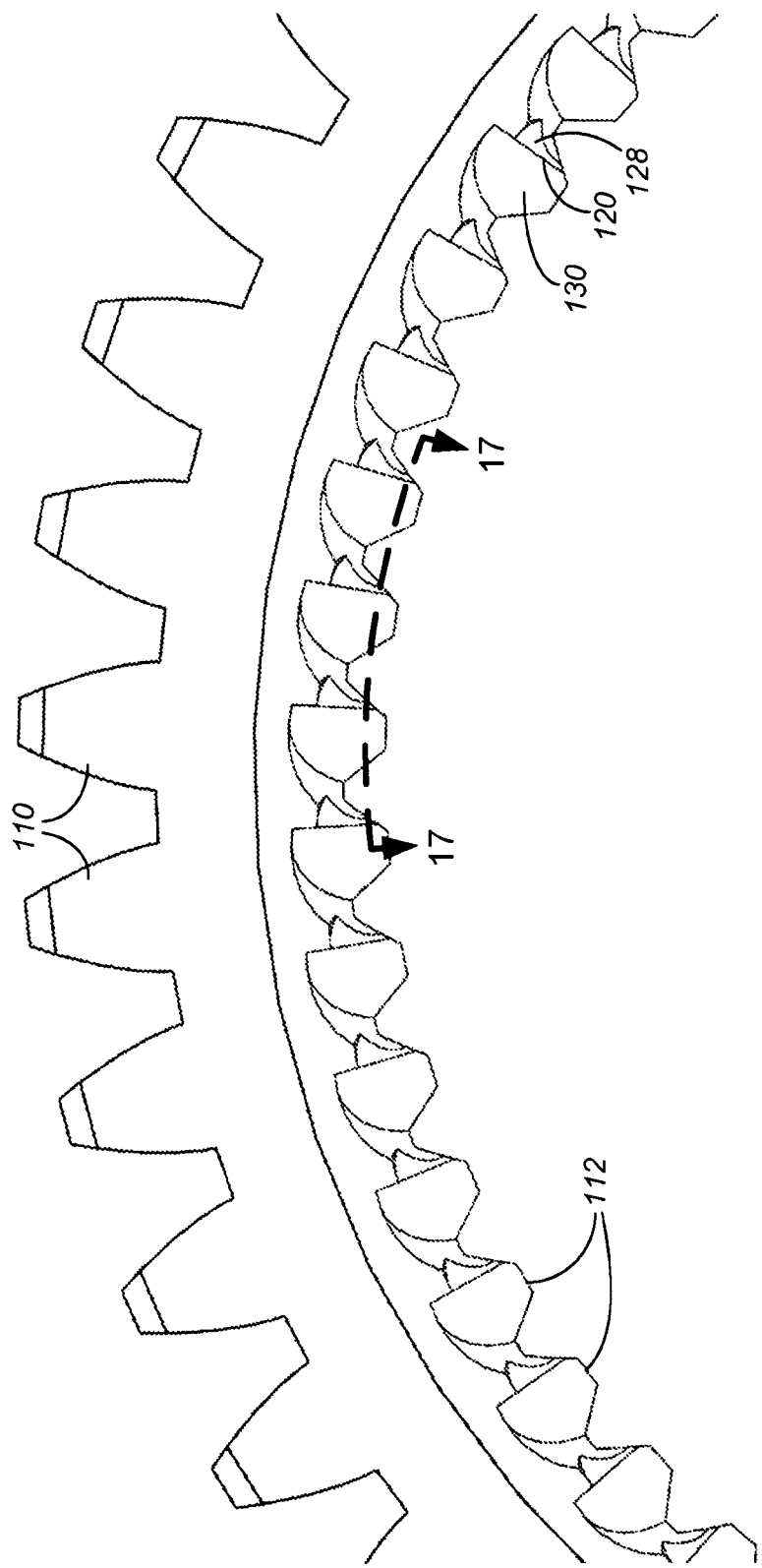
FIG. 16 is an enlarged view of a portion of FIG. 15.

The driving gear 50 includes a middle section providing an outer diameter recess 102 or channel which receives the shifting fork 76, and the shifting fork 76 is used to push the driving gear 50 in either axial direction. Thus one of the faces 100 of the driving gear 50, on one side of the shifting fork 76, can be optionally engaged with the "low" coaxially arranged output gear 64, while the opposing face of the driving gear 50, on the other side of the shifting fork 76, can be optionally engaged with a "high" coaxially arranged output gear 62. FIG. 9 shows the driving gear 50 from the "low" interacting side 100, FIG. 10 shows the driven low gear 64 from its interacting side 104, and FIG. 11 shows both interacting sides 100, 104. When coaxially mounted on the shaft 52 both about the axis 106, the two interacting "low" sides 100, 104 face each other as indicated in FIG. 12. Thus, FIG. 13 shows the driving gear 50 and the low driven gear 64 disengaged relative to each other, and FIG. 14 shows the driving gear 50 and the low driven gear 64 engaged relative to each other.

While selection of the following numerical values depends upon engine power and the amount of torque being transmitted in the power train of any particular vehicle, as well as based on the strength of material(s) used within the power train, the following description explains the cooperating structures of the driving gear 50 and driven gear 64. The most preferred driving gear 50 is formed of steel with an inner diameter 54 most typically in the range of 20-40 mm, and most preferably an inner diameter 54 of about 25-30 mm defined about the axis 106. Torque is transmitted from the shaft 52 to the driving gear 50 as known in the art, most preferably with one or more axially extending spline teeth 108 corresponding between the shaft 52 and the driving gear 50. In the most preferred embodiment as shown in FIG. 4, there are twenty-two teeth 108 on the splined connection. Each tooth 108 has a height which is less than 20% of the inner diameter, with a most preferred tooth height being about 5% of the inner diameter, i.e., each of the twenty-two teeth 108 has a height of about 1.2 mm. The teeth 108 preferably have wide pressure angles to facilitate axial sliding of the driving gear 50 on the shaft 52, such as the most preferred 45° leading and trailing pressure angles. The driving gear 50 is thick enough to transfer the torque being transmitted in the drive train 10, with the most preferred driving gear 50, at its inner diameter 54, being about 14 mm thick in the axial direction. The external teeth or splines 56 on the input shaft 52 that the driving gear 50 rides on are nominally 25 mm in length. This arrangement allows the driving gear 50 to smoothly slide on the splines 56 of the input shaft 52 from a middle, disengaged position, to either a first, high gear position where the driving gear 50 has been slid about 5.5 mm in one axial direction on the input shaft 52, or to a second, low gear position wherein the driving gear 50 has been slid about 5.5 mm in the other axial direction on the input shaft 52 into engagement with the driven low gear 64.

In contrast to the smaller diameter where the three teeth 78 that interact with the high driven gear 62, the outer diameter of the side 100 engageable with the low driven gear 64 is preferably larger, preferably as large as reasonably fits within the outer diameter teeth 110 of the driven low gear 64. For instance, the outer diameter of the side 100 engageable with the low driven gear 64 is preferably over 40 mm, and more preferably with the range of 50-150 mm, and most preferably about 85 mm. In contrast to the low number (in the preferred embodiment, only three) of teeth 78 between the driving gear 50 and the driven high gear 62, the interaction between the driving gear 50 and the driven low gear 64 occurs over numerous teeth 80, such as in excess of ten teeth 80. More preferably, there are between twenty and one hundred teeth 80 which transfer torque from the driving gear 50 to the driven low gear 64, with the most preferred embodiment using fifty-six teeth 80, 112 on both the driving gear 50 and the driven low gear 64. The preferred embodiment has the teeth 80 on the driving gear 50 facing outwardly from the axis 106 and the teeth 112 on the driven low gear 64 facing inwardly toward the axis 106, but the inward/outward facing direction could alternatively be reversed. The teeth 80, 112 should use a relatively high pressure angle, such as a pressure angle in the range of 15 to 60°, with the most preferred embodiment using leading and trailing pressure angles of about 40°. Using a high pressure angle for the teeth 80, 112 helps to allow the driving gear 50 to slide axially into and out of the driven gear 64, but the pressure angle still needs to be low enough for adequate transfer of torque without slippage or binding. The tooth height is relatively small such as less than 5 mm, and a most preferred tooth height of about 1.2 mm. The face width of the teeth 80, 112 preferably is approximately the same as the distance of axial engagement movement between the two gears 50, 64, such as about 5 mm.

The end surfaces of the teeth 80 are not flat and coplanar with the face 100 of the driving gear 50, but rather two chamfers 114, 116 are formed, preferably recessing portions of the end surface of each tooth 80 from the plane of the face 100. For these two chamfers, one is a leading chamfer 114 and one is a trailing chamfer 116 based on the direction that the shaft 52 rotates as shown by arrow 118. The two chamfers 114, 116 do not bisect the tooth 80. One of the chamfers, preferably the trailing chamfer 116 on the driving gear 50, is larger than the other chamfer 114. For instance, the larger chamfer 116 can be 110% to 900% the size of the smaller chamfer 114. In the preferred embodiment, the larger chamfer 116 has a surface area which is about 360% of the surface area of the smaller chamfer 114. Because one of the chamfers is larger than the other, the edge 120 formed by the intersection of the leading chamfer 114 and the trailing chamfer 116 deviates from the center symmetry line of the gear tooth 80 by an offset 122. Preferably the edge 120 is offset 122 at least 0.1 mm from the center symmetry line of the gear tooth, with the preferred embodiment having an offset 122 for the edge 120 of about 0.9 mm from the center symmetry line of the gear tooth 80. In comparison, with fifty-six teeth 80 and a driving gear diameter of about 85 mm, the tooth spacing 124 is about 4.8 mm.

The leading chamfer 114 provides the surface most likely to initiate contact with the end face of the tooth 112 of the other gear 64 as the two gears 50, 64 are brought together. The trailing chamfer 116 provides for further axial advancement, at whatever relative axial velocity 126 is used during axial movement of the gear set 50, 64 into engagement, before first tooth-on-tooth contact. The relative axial velocity is represented on FIG. 18 by arrow 126.

While the leading chamfer 114 and/or the trailing chamfer 116 could be curved surfaces, more preferably the leading chamfer 114 and the trailing chamfer 116 are both planar. Though not necessary, preferably the leading chamfer angle α is equal to the trailing chamfer angle β. On one hand, too low of a chamfer angle α, β results in less benefit of the present invention, while on the other hand too high of a chamfer angle α, β results in increased wear of the chamfer edges 120. The chamfer angle α, β should be in the range of 5 to 50°, with the most preferred leading chamfer angle α and trailing chamfer angle β each being about 35°.

Figure 17:
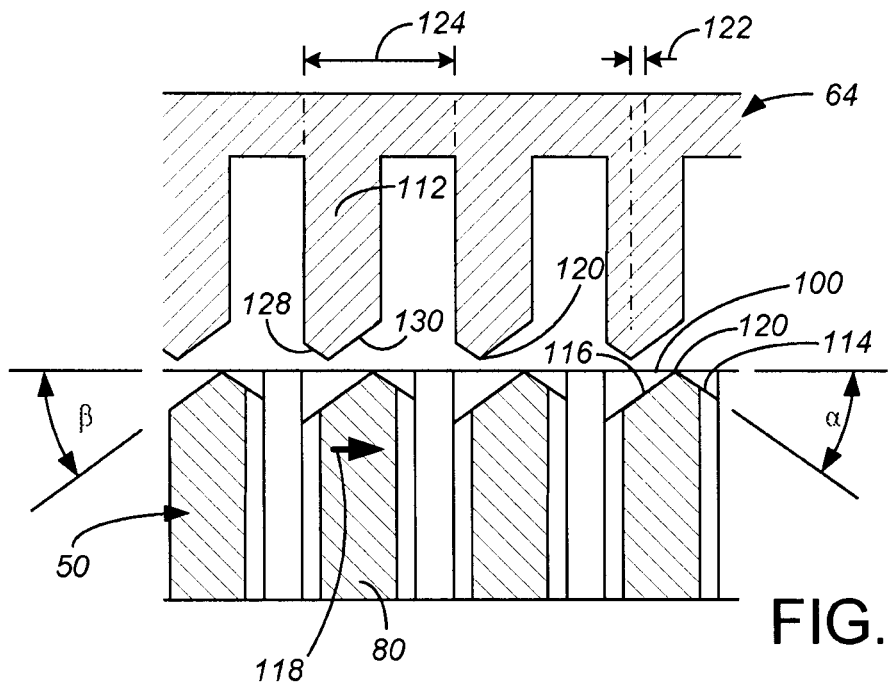
FIG. 17 is a cross-sectional view, taken along the pitch circle as shown by line 17-17 of FIG. 16, of the interacting gear teeth when in the disengaged (park, neutral or reverse).

In the preferred embodiment, identical chamfer profiles are placed on the teeth 112 for the low driven gear 64 as on the teeth 80 for the driving gear 50. As will be understood from review of FIG. 18, the most important aspect is that the leading chamfer angle α on the driving gear 50 be matched by the trailing chamfer angle on the driven gear 64. During most shifting from high gear into low gear, as the driving gear 50 is brought into contact with the driven low gear 64, the rotational velocity 118 of the driving gear 50 (keyed to the shaft 52) will exceed the rotational velocity of the driven gear 64 (freely rotating on the shaft 52). Therefore, the driving gear 50 will contact the driven gear 64 by having the leading chamfer 114 of the driving gear 50 come into contact with the trailing chamfer 128 of the driven gear 64 as shown in FIG. 17. The cooperating nature of the chamfers 114, 128 enables the respective gear teeth 80, 112 to slide past each other and into alignment for full engagement.

Figure 19:
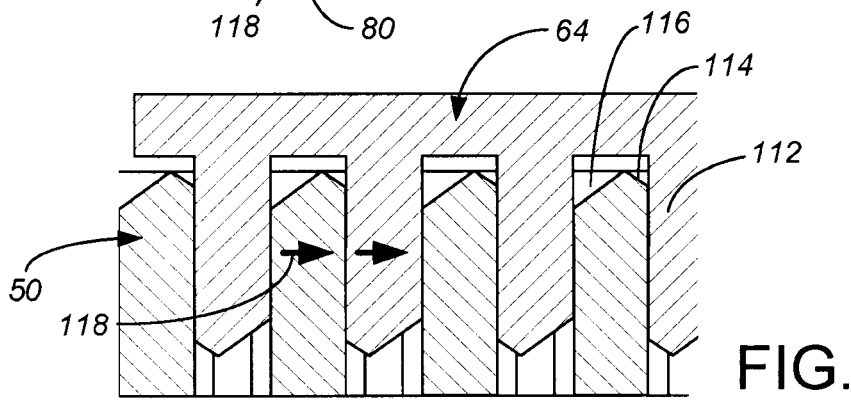
FIG. 19 is a cross-sectional view similar to FIGS. 17 and 19, but showing the interacting gear teeth in the engaged (low) position.

Having the edge 120 offset from the tooth center symmetry line means that, during most shifting from high gear into low gear, at most the cooperating chamfers 114, 128 will need to turn the driven gear 64 an amount of rotation forward which is less than half the tooth spacing 124. For instance, in the most preferred embodiment with tooth spacing 124 of 4.8 mm and an offset 122 of 0.9 mm, most engagements will require chamfer sliding correction of the teeth 80, 112 into alignment of 2.4−0.9=1.5 mm or less, i.e., momentarily accelerating the driven low gear 64 (and/or momentarily decelerating the driving gear 50) so the driven low gear 64 turns at a rotational speed slightly greater than the driving gear 50 until the driven low gear 64 moves about 2° forward (or less) relative to the driving gear 50. It will be further understood that the actual amount of misalignment during initial contact between the driving gear teeth 80 and the driven low gear teeth 112 depends upon the relative axial velocity between the gears 50, 64 as compared to the difference in relative rotational velocity between the gears 50, 64. In many situations the amount of misalignment will be significantly less than 1.5 mm/2°. Once the teeth 80, 112 align between the driving gear 50 and the driven low gear 64, the rest of the relative axial movement between the gears 50, 64 to the fully engaged position shown in FIG. 19 can be achieved without risk of binding, while the operator moves the gear selector 46 causing the ramp 98 to push on the fork 76 and overcome the spring force.

Figure 18:
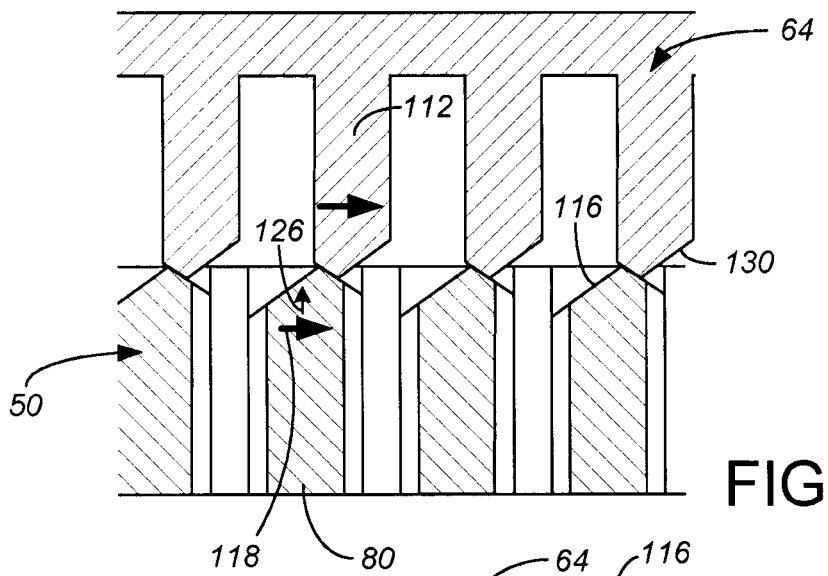
FIG. 18 is a cross-sectional view similar to FIG. 17, but showing the interacting gear teeth when moving into the engaged (low) position.

In contrast to the ordinary situation where the operator will change from high to low gear with the driving gear 50 rotating faster and/or transferring torque to the driven low gear 64, there are some situations (particularly if shifting from high to low gear while coasting/accelerating down hill) when the operator could change from high to low gear with the driving gear 50 rotating slower and/or receiving torque from the driven low gear rotation, in which case the initial contact between the driven low gear 64 and the driving gear 50 will occur between the leading chamfers 130 of the driven low gear teeth 112 and the trailing chamfers 116 of the driving gear teeth 80, opposite what is shown in FIG. 18. With tooth spacing of 4.8 mm and an offset of 0.9 mm, these engagements can require chamfer sliding correction of the teeth 80, 112 into alignment of 2.4+0.9=3.3 mm or less, i.e., momentarily decelerating the driven low gear 64 (and/or momentarily accelerating the driving gear 50) so the driven low gear 64 momentarily turns at a rotational speed slightly less than the driving gear 50 until the driven low gear 64 is retarded about 4° (or less) relative to the driving gear 50.

As will be understood, by offsetting the edge 120 between the leading chamfers 114, 130 and trailing chamfers 116, 128 of the cooperating gear teeth 80, 112, the amount of initial misalignment between cooperating gear teeth 80, 112 is reduced. Accordingly, the present invention reduces the likelihood of binding and allows the gear shifting from high gear to low gear to be more easily accomplished while the vehicle 12 is moving.

Although the present invention has been described with reference to preferred embodiments, workers skilled in the art will recognize that changes may be made in form and detail without departing from the spirit and scope of the invention.

The invention claimed is:

1. A pair of cooperating coaxially arranged gears for transmitting torque in a power train of a vehicle, comprising:
    a first gear configured for transferring power train torque to or from a rotatable shaft, the first gear having a first gear engagement face, with at least ten first gear teeth accessible on the first gear engagement face; and
    a second gear rotationally mountable on the shaft so as to be rotatable relative to the shaft, the second gear having a second gear engagement face, with at least ten second gear teeth accessible on the second gear engagement face;

wherein at least one of the first gear and the second gear are axially moveable on the shaft, such that when the first gear and the second gear are arranged on the shaft with the first gear engagement face facing the second gear engagement face, the gears can be axially moved between a non-engaged position where the first gear teeth and the second gear teeth are not interlocked with each other and an engaged position where the first gear teeth and the second gear teeth are interlocked with each other; and wherein either the first gear teeth or the second gear teeth or both the first gear teeth and the second gear teeth, on their engagement face, have a leading chamfer and a trailing chamfer intersecting at a chamfer edge, wherein each chamfer edge is offset from a center symmetry line of the gear tooth.

2. The pair of cooperating coaxially arranged gears of claim 1, wherein the first gear is a driving gear and the second gear is a driven low gear of a gearbox.

3. The pair of cooperating coaxially arranged gears of claim 2, wherein the driving gear comprises:
an inside diameter with a plurality of axially extending splines for transferring power train torque to or from the shaft; and
a fork-receiving recess on its outer periphery.

4. The pair of cooperating coaxially arranged gears of claim 3, wherein the driving gear is formed of steel with an inside diameter in the range of 20-40 mm, and wherein the axially extending splines each have a height which is less than 20% of the inner diameter.

5. The pair of cooperating coaxially arranged gears of claim 3, wherein the driving gear further comprises a plurality of axially extending teeth on an opposite side of the fork-receiving recess from the first gear engagement face.

6. The pair of cooperating coaxially arranged gears of claim 5, wherein the driving gear has three axially extending teeth on the opposite side of the fork-receiving recess from the first gear engagement face, the three axially extending teeth being closer to the rotational axis than the first gear teeth and closer to the rotational axis than the second gear teeth.

7. The pair of cooperating coaxially arranged gears of claim 2, wherein the first gear teeth on the driving gear extend axially and face outward on an outer periphery of the driving gear, wherein the second gear teeth on the driven low gear extend axially and face inwardly, such that when engaged the second gear teeth collectively extend peripherally around all of the first gear teeth.

8. The pair of cooperating coaxially arranged gears of claim 2, wherein the outer periphery of the driving gear has a diameter of over 40 mm, wherein there are between twenty and one hundred first gear teeth and between twenty and one hundred second gear teeth, each tooth having a tooth height of less than 5 mm, a leading pressure angle in the range of 15 to 60°, and a trailing pressure angle in the range of 15 to 60°.

9. The pair of cooperating coaxially arranged gears of claim 1, wherein the leading chamfer has a leading chamfer angle in the range of 5 to 50°, and wherein the trailing chamfer has a trailing chamfer angle in the range of 5 to 50°.

10. The pair of cooperating coaxially arranged gears of claim 9, wherein the leading chamfer angle is equal to the trailing chamfer angle.

11. The pair of cooperating coaxially arranged gears of claim 1, wherein the first gear is a driving gear transferring power train torque from its shaft, wherein the leading and trailing chamfers are on the gear teeth of the first gear, and wherein the trailing chamfer is 110% to 900% the size of the leading chamfer.

12. A power train component for a vehicle comprising:
a shift drum having a shift recess on its outer periphery;
a fork movable based on the shape of the shift recess;
a rotatable shaft carrying power train torque;
a first gear transferring power train torque to or from the shaft, the first gear having a first gear engagement face, with at least ten first gear teeth accessible on the first gear engagement face; and
a second gear rotationally mountable on the shaft so as to be rotatable relative to the shaft, the second gear having a second gear engagement face, with at least ten second gear teeth accessible on the second gear engagement face;

wherein at least one of the first gear and the second gear are axially moveable on the shaft by the fork based upon rotational movement of the shift drum, such that when the first gear and the second gear are arranged on the shaft with the first gear engagement face facing the second gear engagement face, the gears can be axially moved by the fork between a non-engaged position where the first gear teeth and the second gear teeth are not interlocked with each other and an engaged position where the first gear teeth and the second gear teeth are interlocked with each other; and wherein either the first gear teeth or the second gear teeth or both the first gear teeth and the second gear teeth, on their engagement face, have a leading chamfer and a trailing chamfer intersecting at a chamfer edge, wherein each chamfer edge is offset from a center symmetry line of the gear tooth.

13. The power train component of claim 12, wherein the power train component is a gearbox.

14. The power train component of claim 13, wherein rotational movement of the shift drum is controlled by a gear selector in a cab of a vehicle.

15. The power train component of claim 13 wherein the first gear is a driving gear and the second gear is a driven low gear of the gearbox.

16. The power train component of claim 12, further comprising a spring providing a spring force which biases the first gear away from the second gear, wherein the shift recess comprises a ramp which, upon movement of the shift drum, can provide a force overcoming the spring force to move the first gear to the engaged position.

17. A vehicle comprising:
a seat for an operator;
a one or two cylinder internal combustion engine for propelling the vehicle; and
a power train delivering torque from the engine to propel the vehicle, the power train including at least one power train component comprising:
a shift drum having a shift recess on its outer periphery;
a fork movable based on the shape of the shift recess;
a rotatable shaft carrying power train torque;
a first gear transferring power train torque to or from the shaft, the first gear having a first gear engagement face, with at least ten first gear teeth accessible on the first gear engagement face; and
a second gear rotationally mountable on the shaft so as to be rotatable relative to the shaft, the second gear having a second gear engagement face, with at least ten second gear teeth accessible on the second gear engagement face;

wherein at least one of the first gear and the second gear are axially moveable on the shaft by the fork based upon rotational movement of the shift drum, such that when the first gear and the second gear are arranged on the shaft with the first gear engagement face facing the second gear engagement face, the gears can be axially moved by the fork between a non-engaged position where the first gear teeth and the second gear teeth are not interlocked with each other and an engaged position where the first gear teeth and the second gear teeth are interlocked with each other; and wherein either the first gear teeth or the second gear teeth or both the first gear teeth and the second gear teeth, on their engagement face, have a leading chamfer and a trailing chamfer intersecting at a chamfer edge, wherein each chamfer edge is offset from a center symmetry line of the gear tooth.

18. A power train component for a vehicle comprising:
a shift drum having a shift recess on its outer periphery;
a fork movable based on the shape of the shift recess;
a rotatable shaft carrying power train torque;
a first gear transferring power train torque to or from the shaft, the first gear having a first gear engagement face, with at least ten first gear teeth accessible on the first gear engagement face; and
a second gear rotationally mountable on the shaft so as to be rotatable relative to the shaft, the second gear having a second gear engagement face, with at least ten second gear teeth accessible on the second gear engagement face;

wherein at least one of the first gear and the second gear are axially moveable on the shaft by the fork based upon rotational movement of the shift drum, such that when the first gear and the second gear are arranged on the shaft with the first gear engagement face facing the second gear engagement face, the gears can be axially moved by the fork between a non-engaged position where the first gear teeth and the second gear teeth are not interlocked with each other and an engaged position where the first gear teeth and the second gear teeth are interlocked with each other; and wherein either the first gear teeth or the second gear teeth or both the first gear teeth and the second gear teeth, on their engagement face, have a leading chamfer and a trailing chamfer intersecting at a chamfer edge;

further comprising a spring providing a spring force which biases the first gear away from the second gear, wherein the shift recess comprises a ramp which, upon movement of the shift drum, can provide a force overcoming the spring force to move the first gear to the engaged position.

19. The power train component of claim 12, wherein the first gear is a driving gear transferring power train torque from its shaft, wherein the leading and trailing chamfers are on the gear teeth of the first gear, and wherein the trailing chamfer is 110% to 900% the size of the leading chamfer.

20. The vehicle of claim 17, wherein the first gear is a driving gear transferring power train torque from its shaft, wherein the leading and trailing chamfers are on the gear teeth of the first gear, and wherein the trailing chamfer is 110% to 900% the size of the leading chamfer.

* * * * *